(12) United States Patent
Van Buuren

(10) Patent No.: US 9,913,454 B2
(45) Date of Patent: Mar. 13, 2018

(54) PORTABLE AND COLLAPSABLE MODULAR CALF HOUSING SYSTEM

(75) Inventor: Darren Van Buuren, Grassie (CA)

(73) Assignee: POLY DOME ONTARIO, INC. (CA)

( * ) Notice: Subject to any disclaimer, the term of this patent is extended or adjusted under 35 U.S.C. 154(b) by 858 days.

(21) Appl. No.: 12/812,947

(22) PCT Filed: Jan. 14, 2009

(86) PCT No.: PCT/CA2009/000030
§ 371 (c)(1),
(2), (4) Date: Jan. 19, 2011

(87) PCT Pub. No.: WO2009/089617
PCT Pub. Date: Jul. 23, 2009

(65) Prior Publication Data
US 2011/0100302 A1 May 5, 2011

Related U.S. Application Data

(60) Provisional application No. 61/006,464, filed on Jan. 15, 2008.

(30) Foreign Application Priority Data

Jan. 14, 2009 (WO) ................ PCT/CA2009/000030

(51) Int. Cl.
*A01K 1/02* (2006.01)
*A01K 1/00* (2006.01)
*A01K 1/10* (2006.01)

(52) U.S. Cl.
CPC .......... *A01K 1/0209* (2013.01); *A01K 1/0088* (2013.01); *A01K 1/105* (2013.01)

(58) Field of Classification Search
CPC .. A01K 1/0035; A01K 1/0088; A01K 1/0227; A01K 1/0209; A01K 5/0107
(Continued)

(56) References Cited

U.S. PATENT DOCUMENTS 1,429,917 A    9/1922  Abendroth
3,541,994 A *  11/1970 Sauey et al. .................. 119/528
(Continued)

FOREIGN PATENT DOCUMENTS

| CA | 1139165 A1 | 1/1983 |
| CA | 1182005 A  | 2/1985 |
| CA | 2604871 A1 | 12/2008 |

OTHER PUBLICATIONS http://www.daylife.com/photo/0fcYb5eIOK5aR; last visited on Aug. 7, 2009.
(Continued)

*Primary Examiner* — Thanh Pham
(74) *Attorney, Agent, or Firm* — Steven M. Greenberg; CRGO Law

(57) ABSTRACT

A portable and collapsible modular calf housing system featuring at least one pen comprising a front panel and two side panels and optionally a rear panel forming a pen. The side panels include channels in which the front panel can slide vertically to adjust the height of a feeding pail attached thereto. The channels are disposed on either face of each side panel to enable a front panel from each one of adjacent pens to be joined to form a plurality of interconnected pens.

8 Claims, 6 Drawing Sheets

(58) Field of Classification Search
USPC .................................................. 119/112, 512
See application file for complete search history.

(56) References Cited

U.S. PATENT DOCUMENTS

| | | | | |
|---|---|---|---|---|
| 3,821,865 | A * | 7/1974 | Steinke | 49/404 |
| 3,858,555 | A * | 1/1975 | Smith | 119/513 |
| 4,205,629 | A | 6/1980 | Wix | |
| 4,292,929 | A * | 10/1981 | Tellers | 119/518 |
| 5,251,572 | A * | 10/1993 | Frame et al. | 119/496 |
| 5,580,316 | A * | 12/1996 | Hill et al. | 472/116 |
| 6,190,084 | B1 * | 2/2001 | Ibanez | 404/6 |
| 6,425,347 | B1 * | 7/2002 | Bogner et al. | 119/318 |
| 6,945,194 | B2 * | 9/2005 | Fritsch | 119/454 |
| 7,111,828 | B2 * | 9/2006 | Rosine et al. | 256/24 |
| 7,234,275 | B1 * | 6/2007 | Haggy et al. | 52/71 |
| 8,141,517 | B2 * | 3/2012 | Shimoda et al. | 119/473 |
| 8,186,306 | B2 * | 5/2012 | Hampel | 119/514 |
| 2002/0025221 | A1 * | 2/2002 | Johnson | 404/6 |
| 2006/0070582 | A1 * | 4/2006 | Prescott | 119/512 |
| 2010/0300373 | A1 * | 12/2010 | Kell | 119/512 |
| 2011/0180012 | A1 * | 7/2011 | Meyer, Jr. | 119/512 |

OTHER PUBLICATIONS

Calf-Tel Pen System; http://www.calftel.com/products/CT-08034_Pen_SS_r3.pdf>; last visited on Apr. 8, 2009 (discloses device made public at least as early s Feb. 13, 2007 at the 2007 World AG Expo).

The New Calf-Tel Pen Chosen as Featured New Product for 2007 World AG Expo; http://www.calftel.com/news/news_template.php?n=14; last visited on Apr. 8, 2009; published Nov. 5, 2006.

* cited by examiner

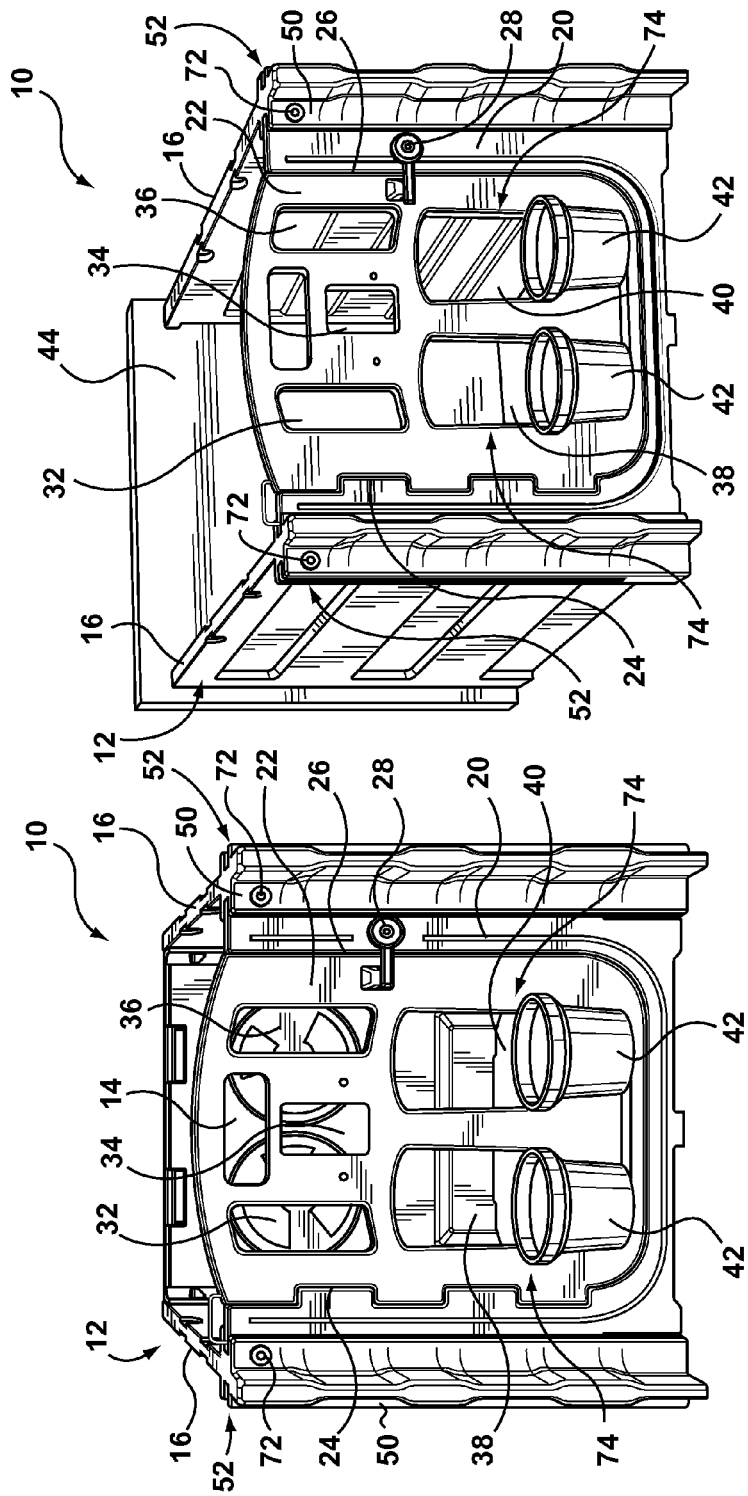

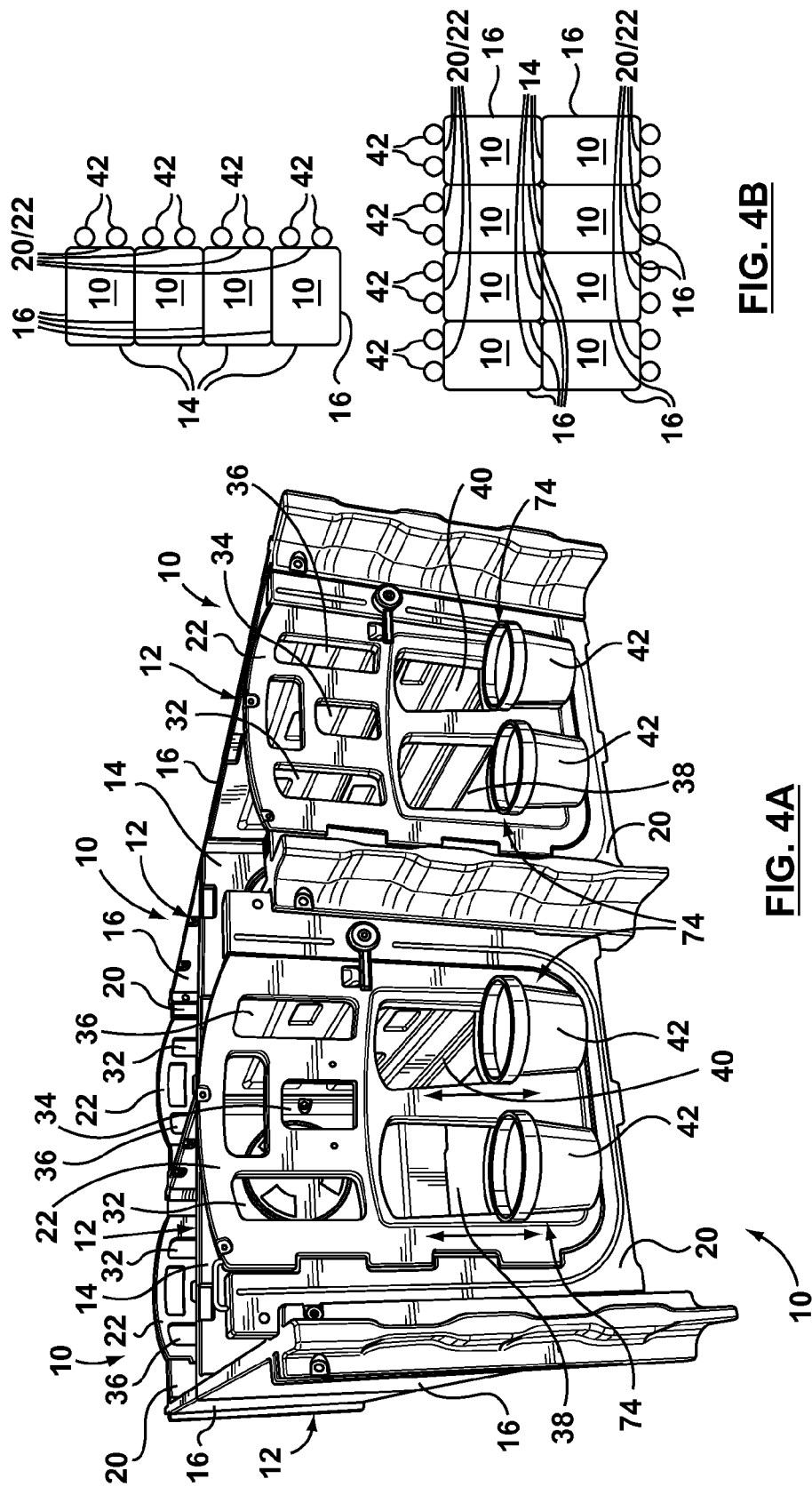

PORTABLE AND COLLAPSABLE MODULAR CALF HOUSING SYSTEM

CROSS-REFERENCE TO RELATED APPLICATIONS

This application is a Submission Under 35 U.S.C. § 371 for U.S. National Stage Patent Application of International Application Number PCT/CA2009/000030, filed Jan. 14, 2009, and entitled PORTABLE AND COLLAPSIBLE MODULAR CALF HOUSING SYSTEM, which is related to and claims priority to U.S. Patent Application Ser. No. 61/006,464, filed Jan. 15, 2008, the entirety of both are incorporated herein by reference.

FIELD OF INVENTION

The present invention relates to a calf housing system, particularly a system and method for housing calves individually.

BACKGROUND OF THE INVENTION

Calves are born with a relatively immature immune system and, in particular, pre-weaned calves are susceptible to infectious pathogens that may be spread by the air-borne, fecal-oral or calf-to-calf transmission routes. Because transmission of enteric pathogens in calves is primarily through animal to animal contact, it has become common practice to isolate calves from others to reduce the risk of infectious diseases.

It is important, however, to have appropriate housing isolation units to maintain a positive effect on the growth, health and well-being of a diary calf. Good design can provide a healthy environment that reduces environmental stress. For example, high levels of moisture, pollutants and air-borne pathogens may lead to respiratory problems that have long term effects. Thus, there has been an on-going need for management environments that provide calves with a clean, dry, well-ventilated space, especially in locations that may experience severe fluctuations in temperature.

Several attempts have been made to provide appropriate housing for calves. For example, U.S. Pat. No. 6,964,245 provides a rigid pen, including an outer frame defining an open floor attached to a motorized vehicle. The vehicle is operated to raise the pen off the ground and deliver the raised pen to an area at which the calf and the mother cow are located. The vehicle then positions the raised pen over the calf. Finally, the pen is lowered such that the calf is inside of the pen and the mother cow is outside of the pen. The calf, in the pen, can then be housed in a manner in which the handler has access without interference from the mother.

United States Patent application 20070178525 provides methods for managing livestock to improve performance and health of the general livestock population by reducing the impact of subclinical animals persistently infected with a contagious disease by separating animals into arrival groups, screening all animals for the pathogen of the contagious disease, promptly removing the pathogen positive animals from the general livestock population and feeding and managing the pathogen negative animals and pathogen positive animals separately. In preferred embodiments, the pathogen positive animals are removed from their arrival group within about 1.5-3 days after arrival. In preferred embodiments, the method of the present invention is applied in a cattle operation such as a seedstock operation, a cow-calf operation, a stocker operation, a backgrounding operation, a feedlot operation, a dairy operation, a farm of origin, such as a dairy farm, an auction facility, a gathering point or a buyer facility.

Another type of calf housing system is marketed by Calf-Tel for Hampel products that can be used to house calves. While the Calf-Tel hutches provide a useful alternative to other types of hutches, they do not provide for adjustability as the calf grows.

Thus, there was an unmet need for a calf housing system that addresses the requirements for good ventilation, isolation, disease reduction and adjustability in farm management practices.

SUMMARY OF THE INVENTION

It is an object of the invention to provide an improved calf housing system.

One aspect of the present invention relates to a method of isolating a calf from other calves and cows. The method includes providing a portable, rigid pen that provides systems for ventilation and for providing adequate nutrition to the calf as it grows with a minimum of environmental stress.

In another aspect, the invention provides a portable pen for isolating a calf. The pen includes a frame that has a front, a back, and opposing sides that combine to define an interior pen area. In one preferred embodiment, the pen has an open floor and functions as a free standing pen that can be moved to various locations based on environmental conditions such as drainage, the direction of the prevailing winds or a temperature and humidity controlled facility.

In another preferred embodiment, the includes a rear wall.

In a further embodiment, the is adapted for attachment to a wall whereby the wall forms the rear of the enclosure.

In yet another embodiment, the includes a floor.

In a preferred embodiment, the pen includes a door hingedly attached to the front of the frame. Conventional hinges or pins may be used. The door or gate is preferably attached to the front such that the door can swing inwardly or outwardly relative to the frame. The gate preferably includes ventilation openings and locations for inclusion of optional features such as a headlock, a bottle holder, a wall bracket and a bottle. The opposing side panels are adapted for interconnection between multiple pens and also include channels in which the front of the frame fits. In a preferred embodiment, both the front panel and the side channels include apertures.

In a preferred embodiment of the invention, the frame includes at least one feed pail. The vertical location of the feed pail/front panel can be adjusted, as the calf grows, to facilitate feeding. In a preferred embodiment, the height, or vertical positioning, of the front panel is adjusted by sliding the panel in the channels of the side members and securing the panel at a specific height by inserting a pin in corresponding apertures in the front panel and the side panels. Other means of adjusting the height of the feeding pails, such as a spring loaded, ratcheting or hydraulic systems, are included within the scope of the invention.

BRIEF DESCRIPTION OF THE DRAWINGS

These and other features of the invention will become more apparent from the following description in which reference is made to the appended drawings wherein:

FIG. 1 is a view of one embodiment of a calf housing pen in accordance with one aspect of the invention;

FIG. 2 is a view of another embodiment of a calf housing pen in accordance with the present invention;

FIG. 4A is a front view illustrating how the feed buckets can be adjusted vertically;

FIG. 4B illustrates various confirmation in which the pens can be attached to each other;

DETAILED DESCRIPTION

Figure 3:
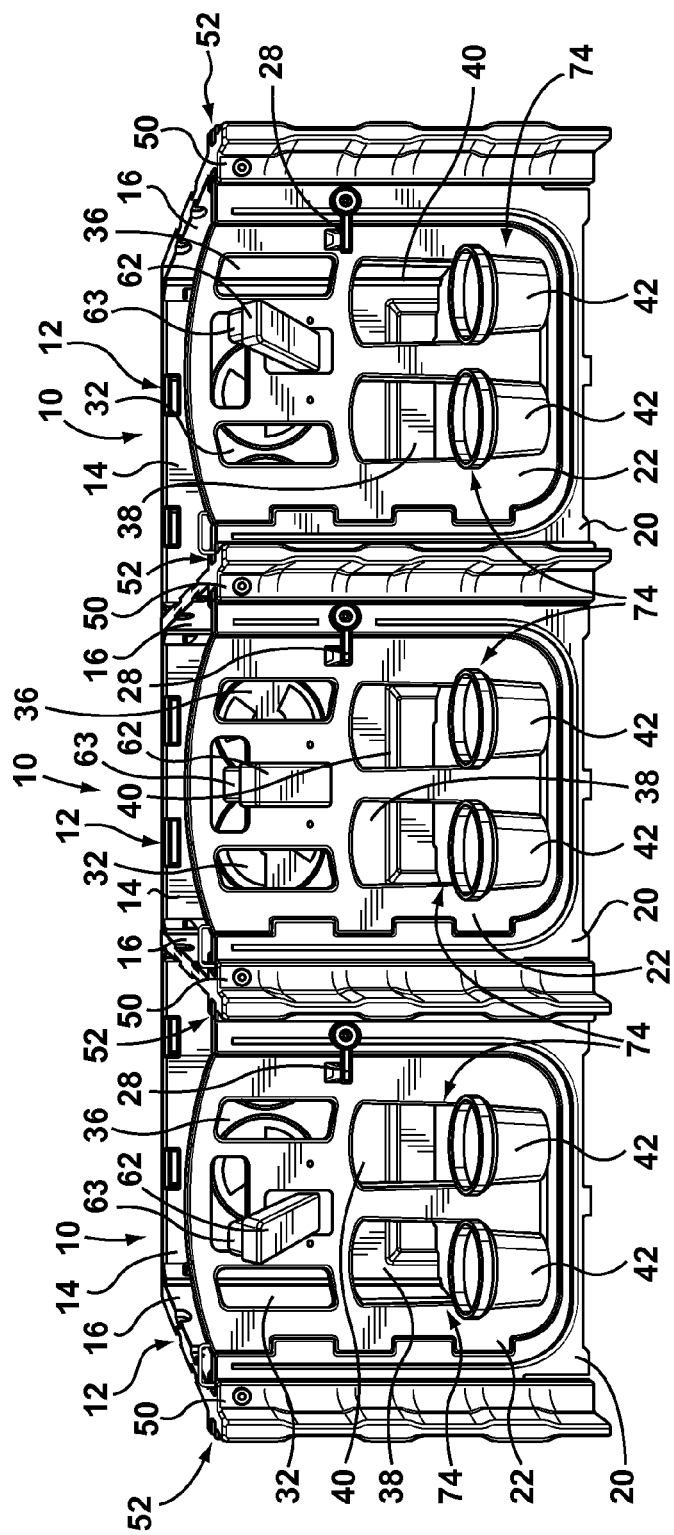
FIG. 3 is a front view of a complex of calf housing pens attached along their sides in accordance with one embodiment of the invention.

One embodiment of a portable pen unit 10 in accordance with the present invention is shown in FIG. 1. The pen unit 10 includes a frame 12 that comprises a rear panel 14, two opposing side panels 16 and a front panel 20. A door 22 is inserted in the front panel 20. The door 22 is hingedly attached at one side 24 to the front panel 20. The door 22 may be adapted to swing either inward or outward relative to the front panel 20. The opposite side 26 of the door is releasably maintained in a closed position by a latching mechanism 28. The latching mechanism 28 may comprise any type of known latching/securing mechanisms. For example, the hinges of the door 22 may be outwardly biased and the door 22 is latched by a simple stop member being rotated into position. Alternatively, the latching mechanism may incorporate a slide and bolt system or a click and fit system. In the embodiment illustrated in FIG. 1, the floor of the pen unit 10 is open and the pen unit 10 may be placed on any suitable surface. The door 22 typically includes openings 32, 34, 36, 38, 40 for feeding and ventilation and for insertion of optional items. The door 22 is equipped with at least one feeding pail receptacle 74 for receiving a corresponding feeding pail 42; the apertures 38, 40 in each door 22 provide access to the feeding pails 42 when received in the feeding pail receptacle 74. As discussed in further detail below, the height or vertical positioning of the feeding pail receptacles 74 and the feeding pails 42 carried thereby can be adjusted as the calf grows by raising or lowering the front panel 20; in FIG. 4A the front panel 20 of the leftmost pen 10 is raised relative to the front panel 20 of the rightmost pen 10. In a preferred embodiment, the front panel 20 is attached to the side panels 16 via a connector 50 on the side panel 16 which has a receiving channel 52 for the front panel 20 in the form of a tongue and groove mechanism. To raise the feeding pail receptacles 74 and thereby raise the feed pails 42 the front panel 20 is moved up and a locking pin 72 is inserted into an aperture 70 (FIG. 7) in the front panel 20. This mechanism is discussed in greater detail below with respect to FIG. 7.

In the embodiment illustrated in FIG. 2, the pen unit 10 is adapted for mounting on a wall 44 and the wall 44 to which it is attached forms the rear wall of the pen unit 10; thus the rear panel 14 is omitted.

FIG. 3 illustrates an embodiment in which several pen units 10 can be attached to each other. This provides additional stability and keeps the calves close enough to each other for easy handling, yet still separated. The pen units 10 can be attached to each other through the above-noted tongue and groove mechanism, with the edges of the front panels 20 received in the receiving channels 52 (FIGS. 1 and 7) of opposed side panels 16. As shown in FIGS. 1 and 2, the side panels 16 include connectors 50 with receiving channels 52 to receive the edges of the front panels 20 to form a plurality of tongues and grooves. The modular nature of the present invention including the interlocking tongue and groove system allows for quick and easy assembly and disassembly of pen units 10 in minutes. In a preferred embodiment the components are made of durable polyethylene and are light weight and easy to clean. The built-in calf dividers keep the calves apart to prevent the spread of disease and the built-in feeding pail receptacles 74 with pail divider prevents food contamination. The polyethylene surface of the component panels does not promote the growth of bacteria or the spread of infectious diseases.

FIG. 4A illustrates another configuration in which pen units 10 can be attached side to side and front to back. FIG. 4B illustrates schematically how the pen units 10 can be configured to fit one's needs.

Figure 5C:
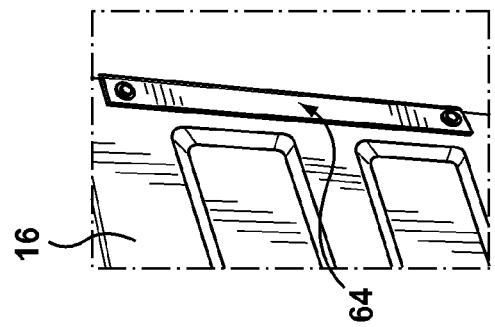
FIG. 5C illustrates an optional wall bracket for use with the present invention.
Figure 5B:
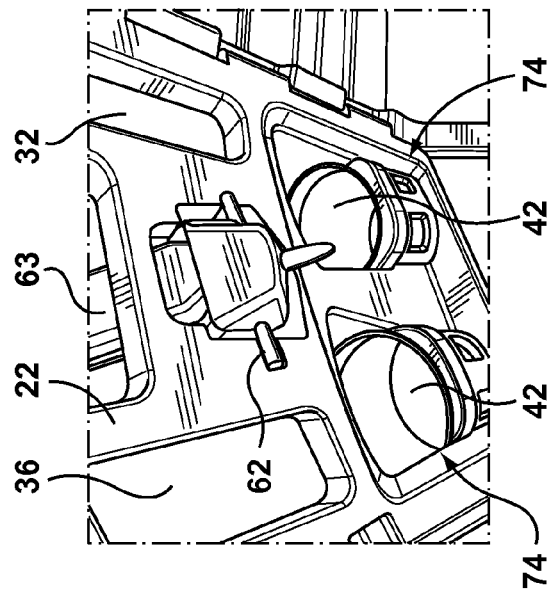
FIG. 5B illustrates an optional quick release bottle holder for use with the present invention.
Figure 5A:
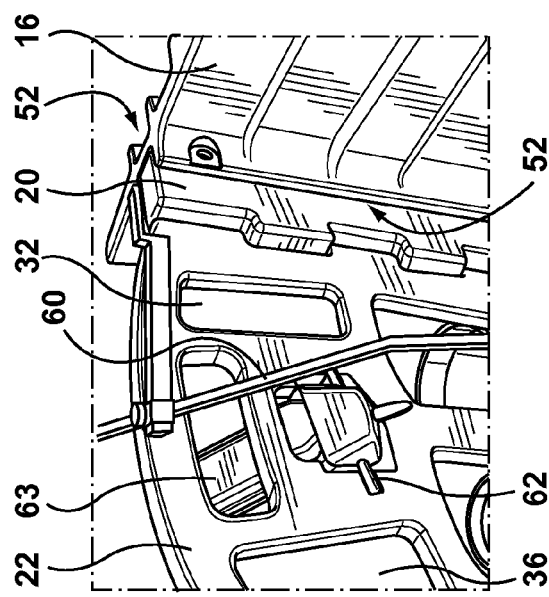
FIG. 5A illustrates an optional headlock for use with the present invention.

FIGS. 5A, B and C illustrate optional features which can be included with the calf housing pens. FIG. 5A illustrates how a headlock device 60 can be incorporated. FIG. 5B illustrates a quick release bottle holder 62 for feeding calves and FIG. 5C illustrates a wall bracket 64 for attaching the pen. All of the optional features may be provided in a kit which includes the basic building blocks of the pen 10 (i.e. rear panel 14, side panels 16 and front panel 20 including door 22) as well as the quick release bottle holder 62 and the bottle 63 itself.

Figure 6:
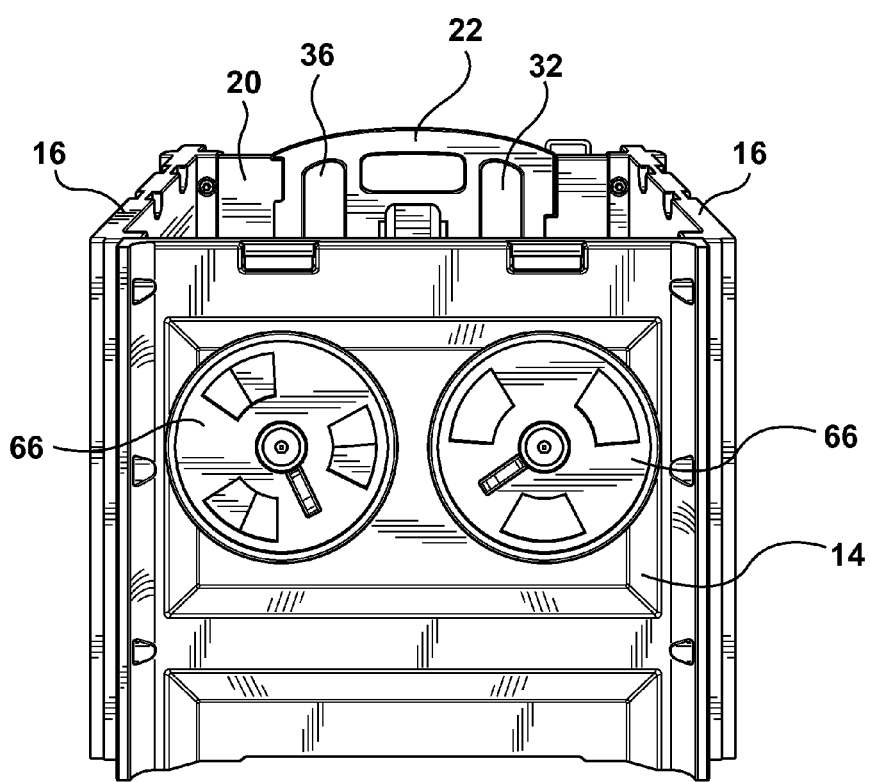
FIG. 6 illustrates optional rotary vents for use with the present invention.

As discussed previously, excellent air quality in a pen is essential to raising healthy calves. Different air exchange rates may be needed depending on the environmental conditions. The pen units of the present invention are preferably equipped with means for circulating air. In a preferred embodiment, rotary vents 66 are provided in the rear panel 14 as illustrated in FIG. 6.

Figure 7:
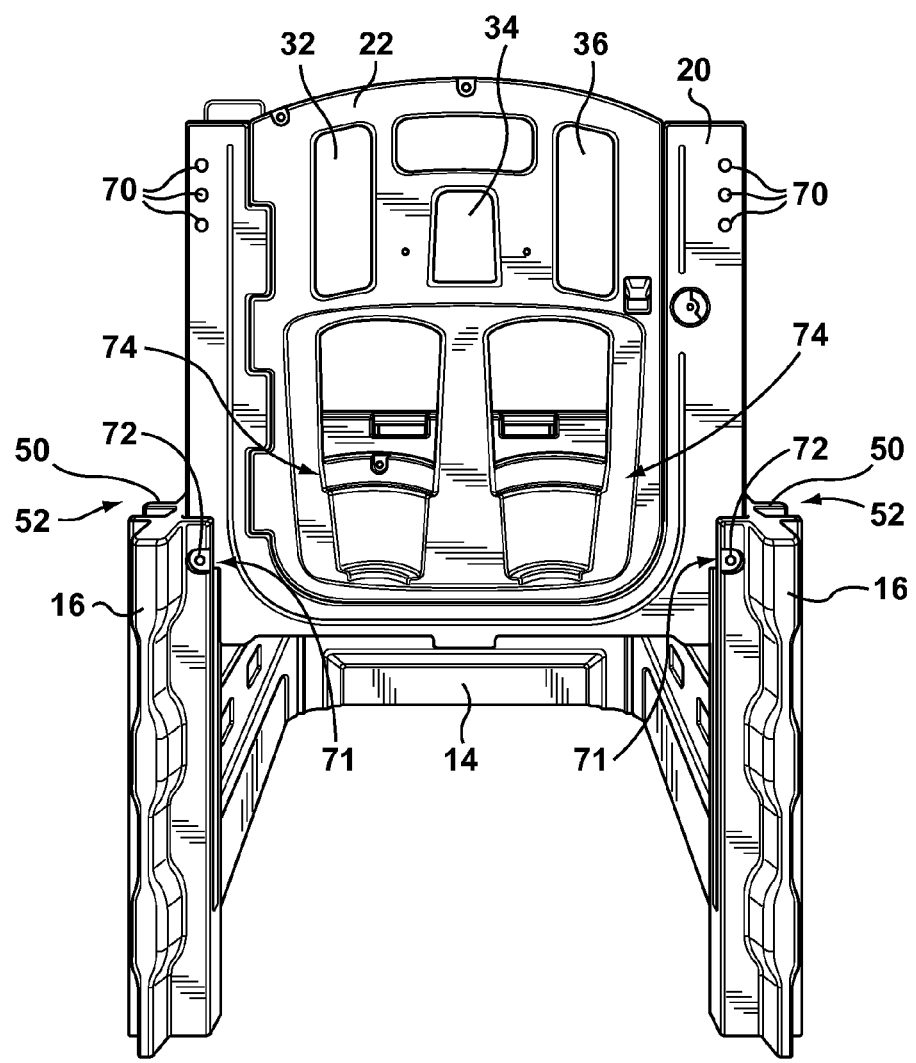
FIG. 7 illustrates how the front panel can be adjusted vertically to provide the calf with a feeding pail in position according to its height.

FIG. 7 illustrates how the front panel can be raised up and down in channels 50 associated with the side panels 16. In the preferred embodiment illustrated in this figure, there are three apertures 70 located near the top of the front panel 20 on each side thereof. There is also an aperture 71 in each of the side panels that is adapted to receive a positioning pin 72. In use, the pen 10 is usually initially set up with the front panel 20 secured in position at the lowest aperture, as shown in FIGS. 1 and 2. As the calf grows the front panel 20 can be raised by sliding it in the channels 52 of the connectors 50 of the side panels 16 and secured at the second aperture position 70 and then at the third aperture position 70. This system provides a unique advantage for dairy farmers. Due to the adjustable pail height, the calves have greater comfort when feeding and thus may have improved growth profiles. FIG. 7 also shows the apertured feeding pail receptacles 74 with the feeding pails 42 removed therefrom.

In one embodiment, the frame of the pen unit 10 is square in transverse cross-section, having dimensions on the order of 8×8 ft. Alternatively, other shapes and dimensions are equally acceptable. Further, in one embodiment, the frame of the pen 10 has a fairly substantial height, on the order of about 3 ft to 6 ft. Other heights are equally acceptable, however, the frame preferably has a height greater than a height of an average cow.

Prior to use, the pen 10 is provided as a kit for assembly. It includes in flat packing the front panel 20 and the side panels 16. If not to be wall mounted, the rear wall panel 14 is also provided. The unique interlocking system allows for easy assembly. Optional features such as the bottle holder 62 and headlock 60 may be provided separately or as part of a "deluxe" kit.

The pen and related method of use of the present invention provides a marked improvement over previous designs. Calves are easily isolated from other animals. The invention provides a structure and a farm management system that allows the farmer to easily gain access to the calf and, at the same time, to reduce the risk of transmission of infectious diseases among the herd. Furthermore the system is easy to assemble and to keep clean and is designed to adapt to the feeding needs of the calf as it grows.

One or more currently preferred embodiments have been described by way of example. It will be apparent to persons skilled in the art that a number of variations and modifications can be made without departing from the scope of the invention as defined in the claims.

What is claimed is:

1. A portable pen unit for use in housing a calf in isolation from a herd, the pen unit comprising a frame having a front panel and opposing side panels combining to define an interior containment area, wherein:
    the front panel carries a door hingedly movable between an open position and a closed position and the door is releasably maintained in the closed position;
    the door carries at least one apertured feeding pail receptacle for receiving a corresponding feeding pail; and
    the at least one apertured feeding pail receptacle is adapted to be vertically movable relative to the opposed side panels to adjust the height of the at least one apertured feeding pail receptacle and the at least one apertured feeding pail receptacle is adapted to be securable in a plurality of stably supported vertical positions relative to the opposed side panels.

2. The pen unit of claim 1 further comprising a rear panel coupled to the side panels, wherein the pen unit omits any floor and is free standing.

3. The pen unit of claim 1 wherein the pen unit is adapted to be mounted to a wall.

4. The pen unit of claim 1, wherein the pen unit has at least one feeding pail received in the at least one apertured feeding pail receptacle.

5. The pen unit of claim 4 wherein said front panel slides vertically within channels on each of the side panels.

6. The pen unit of claim 1, wherein the side panels and front panel include a tongue and groove connector system for easy assembly and disassembly of multiple units as a complex.

7. The pen unit of claim 1, wherein the at least one apertured feeding pail receptacle is formed in the door and the door is carried by the front panel.

8. A portable pen assembly kit for use in housing a calf in isolation from a herd, the portable pen assembly kit comprising a frame having a front panel and opposing side panels combining to define an interior containment area, wherein:
    the front panel carries a door hingedly movable between an open position and a closed position and the door is releasably maintained in the closed position; the door carries at least one apertured feeding pail receptacle for receiving a corresponding feeding pail; and
    the at least one apertured feeding pail receptacle is adapted to be vertically movable relative to the opposed side panels to adjust the height of the at least one apertured feeding pail receptacle and the at least one apertured feeding pail receptacle is adapted to be securable in a plurality of stably supported vertical positions relative to the opposed side panels.

\* \* \* \* \*